(12) United States Patent
Leinonen et al.

(10) Patent No.: US 7,659,223 B2
(45) Date of Patent: Feb. 9, 2010

(54) PROCESS FOR PREPARING AN OLEFIN POLYMERIZATION CATALYST COMPONENT WITH IMPROVED HIGH TEMPERATURE ACTIVITY

(75) Inventors: Timo Leinonen, Tolkkinen (FI); Peter Denifl, Gries am Brenner (AT); Holger Pöhler, Helsinki (FI)

(73) Assignee: Borealis Technology Oy, Porvoo (FI)

( * ) Notice: Subject to any disclaimer, the term of this patent is extended or adjusted under 35 U.S.C. 154(b) by 642 days.

(21) Appl. No.: 10/529,812

(22) PCT Filed: Sep. 30, 2003

(86) PCT No.: PCT/EP03/10854

§ 371 (c)(1),
(2), (4) Date: Oct. 13, 2005

(87) PCT Pub. No.: WO2004/029112

PCT Pub. Date: Apr. 8, 2004

(65) Prior Publication Data
US 2006/0166814 A1     Jul. 27, 2006

(51) Int. Cl.
*B01J 37/08*     (2006.01)

(52) U.S. Cl. .............. 502/104; 502/103; 502/115; 502/118; 502/127; 502/128; 502/132; 526/124.2; 526/124.3; 526/125.1; 526/348

(58) Field of Classification Search .......... 502/103, 502/104, 115, 118, 127, 128, 132; 526/124.2, 526/124.3, 125.1, 348
See application file for complete search history.

(56) References Cited

U.S. PATENT DOCUMENTS

| | | | |
|---|---|---|---|
| 4,294,948 A | 10/1981 | Toyota et al. | |
| 4,845,177 A | 7/1989 | Vogt et al. | |
| 5,409,875 A | 4/1995 | Hsu et al. | |
| 5,413,979 A | 5/1995 | Kostiainen et al. | |
| 6,800,580 B1 * | 10/2004 | Yang et al. | ........ 502/103 |

FOREIGN PATENT DOCUMENTS

| | | | |
|---|---|---|---|
| EP | 0 083 073 | * | 7/1983 |
| EP | 0083073 | | 7/1983 |
| EP | 0083074 | | 7/1983 |
| EP | 0713886 | | 5/1996 |
| EP | 0926165 | | 6/1999 |
| JP | 58111809 | | 7/1983 |
| JP | 63289005 | | 11/1988 |
| JP | 64000105 | | 1/1989 |
| JP | 4055406 | | 2/1992 |
| JP | 5032717 | | 2/1993 |
| JP | 6206932 | | 7/1994 |
| JP | 2002522578 | | 7/2002 |
| WO | WO 97/14723 | | 4/1997 |
| WO | WO 00/08073 | | 2/2000 |
| WO | WO 00/08074 | | 2/2000 |
| WO | 01/32718 | | 5/2001 |
| WO | WO 01/55230 | | 8/2001 |

OTHER PUBLICATIONS

International Search Report from PCT/EP03/10854 mailed on Mar. 2, 2004.

* cited by examiner

*Primary Examiner*—Ling-Siu Choi
(74) *Attorney, Agent, or Firm*—McDonnell Boehnen Hulbert & Berghoff LLP

(57) ABSTRACT

The invention refers to a process for preparing a Group 2 metal/transition metal olefin polymerization catalyst component in particulate form having an improved high temperature activity and the use thereof in a process for polymerizing olefins.

45 Claims, No Drawings

PROCESS FOR PREPARING AN OLEFIN POLYMERIZATION CATALYST COMPONENT WITH IMPROVED HIGH TEMPERATURE ACTIVITY

The invention relates to a process for preparing a particulate olefin polymerisation catalyst component, particularly one comprising a Group 2 metal. The invention also relates to the use of such a catalyst component for preparing a catalyst, the activity maximum of which is shifted to a higher temperature used in the polymerisation of olefins.

BACKGROUND OF THE INVENTION

Ziegler-Natta (ZN) type polyolefin catalysts are well known in the field of polymers, generally, they comprise (a) at least a catalyst component formed from a transition metal compound of Group 4 to 6 of the Periodic Table (IUPAC, Nomenclature of Inorganic-Chemistry, 1989), a metal compound of Group 1 to 3 of the Periodic Table (IUPAC), and, optionally, a compound of group 13 of the Periodic Table (IUPAC) and/or an internal donor compound. ZN catalyst may also comprise (b) further catalyst component(s), such as a cocatalyst and/or an external donor.

Various methods for preparing ZN catalysts are known in the state of art. In one known method, a supported ZN catalyst system is prepared by impregnating the catalyst components on a particulate support material. In WO-A-01 55 230, the catalyst component(s) are supported on a porous, inorganic or organic particulate carrier material, such as silica.

In a further well known method the carrier material is based on one of the catalyst components, e.g. on a magnesium compound, such as $MgCl_2$. This type of carrier material can also be formed in various ways. EP-A-713 886 of Japan Olefins describes the formation of $MgCl_2$ adduct with an alcohol which is then emulsified and finally the resultant mixture is quenched to cause the solidification of the droplets.

Alternatively, EP-A-856 013 of BP discloses the formation of a solid Mg-based carrier, wherein the Mg-component containing phase is dispersed to a continuous phase and the dispersed Mg-phase is solidified by adding the two-phase mixture to a liquid hydrocarbon.

The formed solid carrier particles are normally treated with a transition metal compound and optionally with other compounds for forming the active catalyst.

Accordingly, in case of external carriers, some examples of which are disclosed above, the morphology of the carrier is one of the defining factors for the morphology of the final catalyst.

One disadvantage encountered with the supported catalyst systems is that a possible surface treatment (impregnation step) of the support with one or more catalytically active compounds may lead to non-uniform distribution of the active component(s) and in turn to an inhomogeneous polymer material.

WO-A-00 08073 and WO-A-00 08074 describe further methods for producing a solid ZN-catalyst, wherein a solution of a Mg-based compound and one or more further catalyst compounds are formed and the reaction product thereof is precipitated out of the solution by heating the system. Furthermore, EP-A-926 165 discloses another precipitating method, wherein a mixture of $MgCl_2$ and Mg-alkoxide is precipitated together with a Ti-compound to give a ZN catalyst.

EP-A-83 074 and EP-A-83 073 of Montedison disclose methods for producing a ZN catalyst or a precursor thereof, wherein an emulsion or dispersion of Mg and/or Ti compound is formed in an inert liquid medium or inert gas phase and said system is reacted with an Al-alkyl compound to precipitate a solid catalyst. According to examples said emulsion is then added to a larger volume of Al-compound in hexane and prepolymerised to cause the precipitation.

In general, a drawback of such precipitation methods is the difficulty to control the precipitation step and thus the morphology of the precipitating catalyst particles.

Furthermore, the precipitation of the catalyst component(s) may often proceed via a "tar-like" intermediate stage. Said undesired sticky precipitate agglomerates easily and sticks to the walls of the reactor. The morphology of the catalyst would then of course be lost.

It is also known for some ZN-catalysts known in the art that the catalysts have their activity maximum at a relatively low temperature leading to a decreased or even drastically decreased catalyst activity, if polymerization is desired to carry out at higher temperature.

Accordingly, although much development work has been done in the field of Ziegler-Natta catalysts, there remains a need for alternative or improved methods of producing ZN catalysts with desirable properties.

It is of particular interest to obtain a catalyst in particulate form which results in good and desired polymer properties also when used in polymerization processes, where higher temperature are used. I.e. the catalyst activity maximum is shifted to a higher temperature.

DESCRIPTION OF THE INVENTION

It has been surprisingly found by the inventors of the present invention that catalyst particles having a good morphology, size and uniform particle size distribution can be obtained by the new way of preparing Ziegler-Natta (ZN) type catalysts, for use in olefin polymerization, in particular for propylene polymerisation. The produced catalysts according to the invention have excellent morphology, good particle size distribution and activity maximum at higher temperature. According to the replica effect, the polymer particles produced by using the inventive catalyst have very good morphological properties, too. The inventive catalyst preparation is based on a liquid/liquid two phase system where no separate carrier materials such as silica are needed in order to get solid catalyst particles.

The present invention is therefore directed to a process for preparing an olefin polymerisation catalyst component in the form of particles having a predetermined size range, said process comprising the steps of:

a) preparing a solution of a complex of a Group 2 metal and an electron donor by reacting a compound of said metal with said electron donor or a precursor thereof in an organic liquid reaction medium;

b) adding said solution of said complex to at least one compound of a transition metal to produce an emulsion the dispersed phase of which contains more than 50 mol % of the Group 2 metal in said complex;

c) agitating the emulsion in order to maintain the droplets of said dispersed phase within an average size range of 5 to 200 μm;

d) solidifying said droplets of the dispersed phase;

e) recovering the solidified particles of the olefin polymerisation catalyst component;

wherein an aluminium alkyl compound of the general formula $AlR_{3-n}X_n$ wherein R stands for a straight chain or branched alkyl group having 1 to 20, preferably 1 to 10 and more preferably 1 to 6 carbon atoms, X stands for halogen and n stand for 0, 1, 2 or 3, in particular 0, 1 or 2, is added and brought into contact with the droplets of the dispersed phase of the agitated emulsion before recovering the solidified particles in step e).

The catalysts known so far show often their highest polymerisation activities (activity maximum) at temperatures of about 60 to 70° C. If the polymerisation is carried out at a higher temperature, i.e. above 70° C., e.g. at around 80° C. or higher, as it is e.g. desirable in some specific processes, the activity of the catalyst is not high enough, because the activity maximum of normal catalyst is at lower temperature. The catalyst activity is in some cases at 80° C. about half the activity found at 70° C.

Polymerization processes, where the catalysts of the invention are useful comprise at least one polymerization stage. Typically the polymerization process comprises additional polymerization stages or reactors. In one particular embodiment the process contains at least one bulk reactor zone and at least one gas phase reactor zone, each zones comprising at least one reactor and all reactors being arranged in cascade. In one particularly preferred embodiment the polymerization process for polymerizing olefins, in particular propylene optionally with comonomers, like ethylene or other α-olefins, comprises at least one bulk reactor and at least one gas phase reactor arranged in that order. The process may further comprise pre- and post reactors. In these kinds of processes use of higher polymerization temperature (above 70° C., preferably 80° C. or higher, e.g. 85° C. or higher) either in some or all reactors of the reactor cascade, is preferred in order to achieve some specific properties to the polymers.

The inventors surprisingly found that the addition of a small amount of an alkyl Al compound, e.g. triethyl aluminium, tri iso. butyl aluminium, or an alkyl Al compound bearing one to three halogen atoms, to the liquid/liquid two phase system during the catalyst preparation shifts the polymerisation activity maximum to higher temperatures, without destroying the excellent catalyst morphology. In some instances, the morphology is even better by said catalyst having a slightly higher bulk density.

The basic idea and target of the invention was to obtain a catalyst, the activity maximum of which have shifted to a higher temperature. In practice from polymerization point of view this means that the new catalysts of the invention are very suitable for polymerization processes where higher temperature (>70° C.) are used, because they have their activity maximum at higher temperature range. This means that the catalyst activity remains about the same or is even improved when the polymerization is carried at higher temperature compared to the catalysts prepared without the alkyl Al compound addition. It should be noted that the activity maximum of the catalyst is not necessary at one single temperature point but rather within a temperature range. According to the results obtained by the inventors there seem to be three variables, which effect on the results, namely;

the adding step of Al-compound
the amount of Al-compound
the type of Al-compound.

According to the findings of the inventors it appears to be decisive to add the aluminium compound before the particle formation has been completed so that the aluminium compound might serve as a kind of particle-internal cocatalyst. Accordingly, the addition of the aluminium compound may be started from step b) until the completion of the particle formation. The completion of the particle formation is usually achieved when the remaining toluene-soluble components have been washed out from the catalyst particles during solidifying said particles. Thus, the aluminium compound can be preferably added, in pure form or in the form of a solution, from shortly before the beginning of the emulsion formation until adding it to the washing liquid, mostly toluene, in such an amount that the final Al content of the particles is from 0,05 to 1%, preferably 0,1 to 0,8% and most preferably 0,2 to 0,7% by weight of the final catalyst particles. The most preferred Al content can vary depending on the type of the Al compound and on the adding step. E.g. in some cases the most preferred amount can be e.g. 0,1 to 0,4 wt-%.

The inventors found out that the preferred compounds are tri-($C_1$-$C_6$)-alkyl aluminium compounds, triethylaluminium being most preferred.

The new inventive method can be easily scaled up in order to avoid common up-scaling problems in the prior art which led to unsatisfied catalyst morphology and particle size distribution as well as reduced activity at higher temperature.

Preferably, the inventive process further comprises washing and drying said recovered solidified particles to obtain said catalyst component in a purified form.

The Group 2 metal used in step a of the inventive process is preferably magnesium, and the liquid organic medium comprises preferably a $C_6$-$C_{10}$ aromatic hydrocarbon, preferably toluene.

As electron donor compound to be reacted with the Group 2 metal compound is preferably an mono- or diester of an aromatic carboxylic acid or diacid, the latter being able to form a chelate-like structured complex. Said aromatic carboxylic acid ester or diester can be formed in situ by reaction of an aromatic carboxylic acid chloride or diacid dichloride with a $C_2$-$C_{16}$ alkanol and/or diol, and is preferable dioctyl phthalate.

The reaction for the preparation of the Group 2 metal complex is generally carried out at a temperature of 20° to 80° C., and in case that the Group 2 metal is magnesium, the preparation of the magnesium complex is carried out at a temperature of 50° to 70° C.

The compound of a transition metal is preferably a compound of a Group 4 metal. The Group 4 metal is preferably titanium, and its compound to be reacted with the complex of a Group 2 is preferably a halide.

In a further embodiment of the invention, a compound of a transition metal used in the process can also contain organic ligands typically used in the field known as a single site catalyst.

In a still further embodiment of the invention, a compound of a transition metal can also be selected from Group 5 metals, Group 6 metals, Cu, Fe, Co, Ni and/or Pd compounds.

The complex of the Group 2 metal is preferably a magnesium complex. The invention will henceforth be described in relation to a preferred embodiment of the process, namely to a process for the preparation of a Ziegler-Natta type catalyst.

In a preferred embodiment, the present invention is directed to a process for producing catalysts of the Ziegler-Natta type in the form of particles having a predetermined size range, said process comprising: preparing a solution of magnesium complex by reacting an alkoxy magnesium compound and an electron donor or precursor thereof in a $C_6$-$C_{10}$ aromatic liquid reaction medium; reacting said magnesium complex with a compound of at least one fourvalent Group 4 metal at a temperature greater than 10° C. and less than 60° C. to produce an emulsion of a denser, $TiCl_4$/toluene-insoluble, oil dispersed phase having, Group 4 metal/Mg mol ratio 0.1 to 10 in an oil disperse phase having Group 4 metal/Mg mol ratio 10 to 100; agitating the emulsion, optionally in the presence of an emulsion stabilizer and or a turbulence minimizing agent, in order to maintain the droplets of said dispersed phase within an average size range of 5 to 200 μm. The catalyst particles are obtained after solidifying said particles of the dispersed phase by heating.

The said disperse and dispersed phases are thus distinguishable from one another by the fact that the denser oil, if contacted with a solution of titanium tetrachloride in toluene, will not dissolve in it. A suitable solution for establishing this criterion would be one having a toluene mol ratio of 0.1 to 0.3. They are also distinguishable by the fact that the great preponderance of the Mg provided (as complex) for the reaction with the Group 4 metal compound is present in the dispersed phase, as revealed by comparison of the respective Group 4 metal/Mg mol ratios.

In effect, therefore, virtually the entirety of the reaction 10' product of the Mg complex with the Group 4 metal—which is the precursor of the ultimate catalyst component—becomes the dispersed phase, and proceeds through the further processing steps to the final dry particulate form. The disperse phase, still containing a useful quantity of Group 4 metal, can be reprocessed for recovery of that metal.

The production of a two-phase, rather than single-phase (as in prior practice) reaction product is encouraged by carrying out the Mg complex/Group 4 metal compound reaction at low temperature, specifically above 10° C. but below 60° C., preferably between above 20° C. and below 50° C. Since the two phases will naturally tend to separate into a lower, denser phase and supernatant lighter phase, it is necessary to maintain the reaction product as an emulsion by agitation, preferably in the presence of an emulsion stabiliser.

The resulting particles from the dispersed phase of the emulsion are of a size, morphology (spherical shape) and uniformity which render the ultimate catalyst component extremely effective in olefin polymerisation. This morphology is preserved during the heating to solidify the particles, and of course throughout the final washing and drying steps. It is, by contrast, difficult to the point of impossibility to achieve such morphology through precipitation, because of the fundamental uncontrollability of nucleation and growth, and the large number of variables which affect these events.

The electron donor is preferably an aromatic carboxylic acid ester, a particularly favoured ester being dioctyl phthalate. The donor may conveniently be formed in situ by reaction of an aromatic carboxylic acid chloride precursor with a $C_2$-$C_{16}$ alkanol and/or diol. The liquid reaction medium preferably comprises toluene.

Furthermore, emulsifying agents/emulsion stabilisers can be used additionally in a manner known in the art for facilitating the formation and/or stability of the emulsion. For the said purposes e.g. surfactants, e.g. a class based on acrylic or methacrylic polymers can be used. Preferably, said emulsion stabilizers are acrylic or methacrylic polymers, in particular those with medium sized ester side chains having more than 10, preferably more than 12 carbon atoms and preferably less than 30, and preferably 12 to 20 carbon atoms in the ester side chain. Particular preferred are unbranched $C_{12}$ to $C_{20}$ acrylates such as poly(hexadecyl)-methacrylate and poly(octadecyl)-methacrylate.

Furthermore, improved results can be obtained if a turbulence minimizing agent (TMA) is added to the reaction mixture. By using said TMA, catalyst component particles can be obtained, said particles having very narrow size distribution.

Though the mechanism of action of said TMA is not fully understood, it is assumed that said TMA serves for a grain size limitation by reducing the turbulences in the emulsion during agitation, thus leading to a more uniform grain formation. Most probably, the mixing energy is better distributed into the emulsion. Further reasons might be seen in an interaction of the TMA with the surface of the grain, leading to a size limitation of the grain.

Reaction mixture here means the solution from the initial organic liquid reaction medium, over the solution of the complex up to the emulsion before solidifying the particles of the dispersed phase of the emulsion. Preferably, the TMA is added to the reaction mixture when the emulsion is formed. Experiments of the inventors have shown that the TMA has to be added to the reaction mixture in any case before solidification of the droplets of the dispersed phase starts in order to make sure that a quite uniform particle size distribution can be obtained.

Said TMA agent has to be inert under the reaction conditions and soluble in the reaction mixture under the reaction conditions, which means that preferably polymers without polar groups are preferred.

Accordingly, said TMA or mixtures thereof are preferred as polymers having linear aliphatic carbon backbone chains, which might be branched with short side chains only in order to serve for uniform flow conditions when stirring. Said TMA is in particular preferably selected from α-olefin polymers having a high molecular weight of MW about $1\text{-}40\times10^6$, or mixtures thereof. Especially preferred are polymers of α-olefin monomers with 6 to 20 carbon atoms, most preferable is polydecene.

In more detail, the turbulence minimizing agent is preferably selected from the group consisting of inert poly($C_6$-$C_{20}$)-olefines or mixtures thereof, and more preferably from polyoctene, polynonene, polydecene, polyundecene or polydodecene or mixtures thereof, having the molecular weight and general backbone structure as defined before.

Usually, said turbulence minimizing agent can be added in any process step before particle formation starts, i.e. in any step before solidification of the emulsion, and is added to the emulsion in an amount of 1 to 1.000 ppm, preferably 5 to 100 ppm and more preferable 5 to 50 ppm, based on the total weight of the reaction mixture.

It has been found that the best results are obtained when the Group 4 metal/Mg mol ratio of the denser oil is 1 to 5, preferably 2 to 4, and that of the disperse phase oil is 55 to 65. Generally the ratio of the mol ratio Group 4 metal/Mg in the disperse phase oil to that in the denser oil is at least Solidification of the dispersed phase droplets by heating is suitably carried out at a temperature of 70-150° C., usually at 90-110° C. Preparation of the magnesium complex may be carried out over a wide range of temperatures, 20 to 80° C. being preferred, 50 to 70° C. most preferred.

The finally obtained catalyst component is desirably in the form of particles having generally an average size range of 5 to 200 μm, preferably 10 to 100, more preferably 20 to 50 μm.

The present invention further comprehends an olefin polymerisation catalyst comprising a catalyst component prepared as aforesaid, in association with an alkyl aluminium cocatalyst and optionally donors, and the use of that polymerisation catalyst for the polymerisation Of $C_2$ to $C_{10}$-olefins.

The reagents can be added to the aromatic reaction medium in any order. However it is preferred that in a first step the alkoxy magnesium compound is reacted with a carboxylic acid halide precursor of the electron donor to form an intermediate; and in a second step the obtained product is further reacted with the Group 4 metal. The magnesium compound preferably contains from 1 to 20 carbon atoms per alkoxy group, and the carboxylic acid should contain at least 8 carbon atoms.

Reaction of the magnesium compound, carboxylic acid halide and polyhydric alcohol proceeds satisfactorily at temperatures in the range 20 to 80° C., preferably 50 to 70° C. The product of that reaction, the "Mg complex", is however reacted with the Group 4 metal compound at a lower temperature, contrary to previous practice, to bring about the formation of a two-phase, oil-in-oil, product.

Use of an aromatic medium for preparation of the Mg complex contributes to consistent product morphology and higher bulk density. Catalyst bulk density and morphology correlate with product bulk density and morphology the so-called "replication effect".

The technique adopted in the novel regimen of the invention is inherently more precise than that formerly employed, and thus further contributes to product consistency, as well as sharply reducing the volumes of solvent to be handled and thus improving process economics.

The reaction medium used as solvent can be aromatic or a mixture of aromatic and aliphatic hydrocarbons, the latter one containing preferably 5-9 carbon atoms, more preferably 5-7 carbon atoms, or mixtures thereof. Preferably, the liquid reaction medium used as solvent in the reaction is aromatic and is more preferably selected from hydrocarbons such as substituted and unsubstituted benzenes, preferably from alkylated benzenes, even more preferably from toluene and the xylenes, and is most preferably toluene. The molar ratio of said aromatic medium to magnesium is preferably less than 10, for instance from 4 to 10, preferably from 5 to 9.

The recovered particulate product is washed at least once, preferably at least twice, most preferably at least three times with a hydrocarbon, which preferably is selected from aromatic and aliphatic hydrocarbons, preferably with toluene, particularly with hot (e.g. 90° C.) toluene, which might include a small amount, preferably a few vol.-%, such as about 5 vol-% of $TiCl_4$ in it. A further wash is advantageously performed with heptane, most preferably with hot (e.g. 90° C.) heptane, and yet a further wash with pentane. A washing step typically includes several substeps. A favoured washing sequence is, for example, one wash with toluene at 90° C., two washes with heptane at 90° C. and one or two washes with pentane at room temperature. It is also possible that all washings will be done with the same solvent, e.g. toluene.

The washing can be optimized to give a catalyst with novel and desirable properties. Finally, the washed catalyst component is dried, as by evaporation or flushing with nitrogen.

It is preferable that the intermediates as well as the final product of the process be distinct compounds with an essentially stoichiometric composition. Often, they are complexes. A complex is, according to Römpps Chemie-Lexicon, 7. Edition, Franckh'sche Verlagshandlung, W. Keller & Co., Stuttgart, 1973, page 1831, "a derived name of compounds of higher order, which originate from the combination of molecules,—unlike compounds of first order, in the creation of which atoms participate".

The alkoxy magnesium compound group is preferably selected from the group consisting of magnesium dialkoxides, complexes of a magnesium dihalide and an alcohol, and complexes of a magnesium dihalide and a magnesium dialkoxide. It may be a reaction product of an alcohol and a magnesium compound selected from the group consisting of dialkyl magnesiums, alkyl magnesium alkoxides, alkyl magnesium halides and magnesium dihalides. It can further be selected from the group consisting of dialkyloxy magnesiums, diaryloxy magnesiums, alkyloxy magnesium halides, aryloxy magnesium halides, alkyl magnesium alkoxides, aryl magnesium alkoxides and alkyl magnesium aryloxides.

The magnesium dialkoxide may be the reaction product of a magnesium dihalide such as magnesium dichloride or a dialkyl magnesium of the formula $R_2Mg$, wherein each one of the two Rs is a similar or different $C_1$-$C_{20}$ alkyl, preferably a similar or different $C_4$-$C_{10}$ alkyl. Typical magnesium alkyls are ethylbutyl magnesium, dibutyl magnesium, dipropyl magnesium, propylbutyl magnesium, dipentyl magnesium, butylpentylmagnesium, butyloctyl magnesium and dioctyl magnesium. Most preferably, one R of the formula $R_2Mg$ is a butyl group and the other R is an octyl group, i.e. the dialkyl magnesium compound is butyl octyl magnesium.

Typical alkyl-alkoxy magnesium compounds RMgOR, when used, are ethyl magnesium butoxide, butyl magnesium pentoxide, octyl magnesium butoxide and octyl magnesium octoxide.

Dialkyl magnesium, alkyl magnesium alkoxide or magnesium dihalide can react with a monohydric alcohol R'OH, or a mixture thereof with a polyhydric alcohol $R'(OH)_m$.

Typical $C_1$-$C_{20}$ monohydric alcohols are methanol, ethanol, n-propanol, iso-propanol, n-butanol, iso-butanol, sec.butanol, tert.butanol, n-amyl alcohol, iso-amyl alcohol, sec.amyl alcohol, tert.amyl alcohol, diethyl carbinol, akt. amyl alcohol, sec. isoamyl alcohol, tert.butyl carbinol. Typical $C_6$-$C_{10}$ monohydric alcohols are hexanol, 2-ethyl-lbutanol, 4-methyl-2-pentanol, 1-heptanol, 2-heptanol, 4-heptanol, 2,4-dimethyl-3pentanol, 1-octanol, 2-octanol, 2-ethyl-1-hexanol, 1-nonanol, 5-nonanol, dilsobutyl carbinol, 1-decanol and 2,7-dimethyl-2-octanol. Typical $>C_{10}$ monohydric alcohols are n-1-undecanol, n-1-dodecanol, n-1-tridecanol, n-1-tetradecanol, n-1-pentadecanol, 1-hexadecanol, n-1-heptadecanol and n-1 octadecanol. The monohydric alcohols may be unsaturated, as long as they do not act as catalyst poisons.

Preferable monohydric alcohols are those of formula R'OH in which R' is a $C_2$-$C_{16}$ alkyl group, most preferably a $C_4$-$C_{32}$ alkyl group, particularly 2-ethyl-1-hexanol.

The aromatic reaction medium may also contain a polyalcohol, which may be straight- or branched-chain. Typical $C_2$ to $C_6$ polyhydric alcohols may be straight-chain or branched and include ethylene glycol, propylene glycol, trimethylene glycol, 1,2-butylene glycol, 1,3-butylene glycol, 1,4-butylene glycol, 2,3-butylene glycol, 1,5-pentanediol, 1,6-hexanediol, 1,8-octanediol, pinacol, diethylene glycol, triethylene glycol, and triols such as glycerol, methylol propane and pentareythritol. The polyhydric alcohol can be selected on the basis of the activity and morphology it, gives the catalyst component.

Preferably, essentially all of the aromatic car-boxylic acid ester is a reaction product of a carboxylic acid halide, preferably a dicarboxylic acid dihalide, more preferably an unsaturated α,β-dicarboxylic acid dihalide, most preferably phthalic acid dichloride, with the monohydric alcohol.

The compound of a fourvalent Group 4 metal compound containing a halogen is preferably a titanium tetrahalide. Equivalent to titanium tetrahalide is the combination of an alkoxy titanium halide and a halogenation agent therefore, which are able to form a titanium tetrahalide in situ. The most preferred halide is the chloride, for zirconium and hafnium as well as for titanium.

The reaction conditions used in the claimed process may be varied according to the used reactants and agents.

As is known, the addition of at least one halogenated hydrocarbon during the process can lead to further improved catalytic activity. Reactive halogenated hydrocarbons preferably have the formula $R'''X'''_n$ wherein R''' is an n-valent $C_1$-$C_{20}$ hydrocarbyl group, particularly a $C_1$-$C_{10}$ paraffin, X''' is a halogen and n is an integer from 1 to 4.

Such chlorinated hydrocarbons include monochloromethane, dichloromethane, trichloromethane (chloroform), tetrachloromethane, monochloroethane, (1,1)-dichloroethane, (1,2)-dichloroethane, (1,1,1)-trichloroethane, (1,1,2)-trichloroethane, (1,1,1,2)-tetrachloroethane, (1,1,2,2) tetrachloroethane, pentachloroethane, hexachloroethane, (1)-chloropropane, (2)-chloropropane, (1,2)-dichloropropane, (1,3)-dichloropropane, (1,2,3)trichloropropane, (1)-chlorobutane, (2)-chlorobutane, isobutyl chloride, tert.butyl chlorides, (1,4)-dichlorobutane, (1)-chloropentane, (1,5)-dichloropentane. The chlorinated hydrocarbons may also be unsaturated, provided that the unsaturation does not act as catalyst poison in the final catalyst component.

In the above formula, R''' is preferably a mono-or bivalent $C_1$-$C_{10}$ alkyl group, independently, X''' is preferably chlorine and, independently, n is preferably 1 or 2. Preferred compounds include butyl chloride (BuCl), dichloroalkanes such as (1,4)-dichlorobutane, and tertiary butyl chloride.

Though the catalyst preparation according to the inventive method can be carried out batchwise, it is also preferable and possible to prepare the catalyst component semi-continuously our continuously. In such semi-continuous or continuous process, the solution of the complex of the group 2 metal and said electron donor, which is prepared by reacting the compound of said metal with said electron donor in an organic liquid reaction medium, is mixed with at least one compound of a transition metal, which might be solved in the same or different organic liquid reaction medium. The so obtained solution is then agitated, possibly in the presence of an emulsion stabilizer, and then the so-agitated emulsion is fed into a temperature gradient reactor, in which the emulsion is subjected a temperature gradient, thus leading to solidifying the droplets of a dispersed phase of the emulsion. The TMA is preferably contained in the solution of the complex or added to the solution before feeding the agitated solution to the temperature gradient reactor.

When feeding said agitated emulsion to the temperature gradient reactor, an inert solvent, in which the droplets are not soluble, can additionally be fed into that gradient reactor in order to improve the droplet-formation and thus leading to a uniform grain size of the particles of the catalyst component, which are formed in the temperature gradient reactor when passing through said line. Such additional solvent might be the same as the organic liquid reaction medium, which is used for preparing the solution of the complex of the group 2 metal as explained above in more detail.

The solidified particles of the olefin polymerisation catalyst component can subsequently be recovered by an in-stream filtering unit and then, optionally after some additional washing and drying steps in order to remove unreacted starting components, can be stored for further use. In one embodiment the catalyst can be fed after washing steps into the olefin polymerisation reactor, so that a continuous preparation and fed to the reactor is guaranteed.

As it can be seen from the above description of the semi-continuous or continuous process, it is thus possible to use separated reaction vessels for the different process steps and to transfer the reaction products which are prepared in the respective reaction vessels and to fed them in-line into further reaction vessels for formation of the emulsion and, subsequently, of the solidified particles.

It is preferred to use a full-continuous process as the time saving in said process is remarkable. In such fully continuous process, the formation of the solidified particles could be carried out in the temperature gradient line in the kind of pipe reactor, which is sufficiently long and which is subjected said temperature gradient from the starting temperature in the lower range of 20 to 80° C. up to a "solidifying" temperature of 70 to 150° C. The temperature gradient is preferably obtained by means of heating the pipe reactor from the outside by applying normal heaters, microwaves, etc.

As mentioned before, a filtering unit might preferably be used for filtering the solidified particles from the solvent stream. For said filtering unit, various drums and sieving systems can be used, depending on the specific particle sizes.

Some preferred embodiments of the invention are described, by way of illustration, in the following Examples.

In said Examples, Examples 1 to 9, in accordance with the invention, illustrate the various modifications when to add the aluminium compound. Example 10 is a comparative example without any addition of alkyl Al compound.

In the examples the following measuring methods were used:

Melt Flow Rate, MFR: ISO 1133; 230° C., 2,16 kg load

Xylene solubles, XS: Xylene soluble fraction of product at 25° C.

Polymer Bulk Density, BD: ASTM D 1895

Particle Size Distribution, PSD: Measured by Coulter Counter LS 200 at room temperature with n-heptane as medium.

EXAMPLES

Example 1

Preparation of the Soluble Mg-Complex

A magnesium complex solution was prepared by adding, with stirring, 55.8 kg of a 20% solution in toluene of BOMAG A to 19.4 kg 2-ethylhexanol in a 150 l steel reactor. During the addition the reactor contents were maintained below 20° C. The temperature of the reaction mixture was then raised to 60° C. and held at that level for 30 minutes with stirring, at which time reaction was complete. 5.5 kg 1,2-phthaloyl dichloride was then added and stirring of the reaction mixture at 60° C. was continued for another 30 minutes. After cooling to room temperature a yellow solution was obtained.

Preparation of the Catalyst Component (Examples 1 to 9)

19.5 ml titanium tetrachloride were placed in a 300 ml glass reactor equipped with a mechanical stirrer. Mixing speed was adjusted to 170 rpm. After addition of 10.0 ml n-heptane, 1.0 ml of a solution in toluene of 3.0 mg polydecene and 2.0 ml Viscoplex 1-254, 32.0 g of the Mg-complex were added to the stirred reaction mixture over a 10 minute period. During the addition of the Mg-complex the reactor contents were maintained below 30° C.

2.0 ml of a solution in toluene of the aluminium compound (Al-compound and amount see Table 1) were then added to the reaction mixture at room temperature and stirring was maintained at that temperature for a further 15 minutes.

The temperature of the reaction mixture was then slowly raised to 90° C. over a period of 20 minutes and held at that level for 30 minutes with stirring. After settling and syphoning the solids underwent washing with 100 ml toluene at 90° C. for 30 minutes, 60 ml heptane for 20 minutes at 90° C. and 60 ml pentane for 10 minutes at 25° C. Finally, the solids were dried at 60° C. by nitrogen purge, to yield a yellow, air-sensitive powder.

Preparation of the Catalyst Component (Example 7)

The catalyst component was prepared in the same manner as described in example 1, except that the 2.0 ml of a solution in toluene of the aluminium compound were added to the reaction mixture after heating to 90° C.

Preparation of the Catalyst Component (Examples 8 and 9)

The catalyst component was prepared in the same manner as described in example 1, except that the 2.0 ml of a solution in toluene of the aluminium compound were added to the washing toluene.

Preparation of the Catalyst Component (Example 10—Comparative Example)

The catalyst component was prepared in the same manner as described in example 1, except that no aluminium compound was added at all.

Bulk Polymerisation of Propylene

The propylene bulk polymerisation was carried out in a stirred 5 l tank reactor. About 0.9 ml triethyl aluminium (TEA) as a co-catalyst, ca 0.12 ml cyclohexyl methyl dimethoxy silane (CMMS) as an external donor and 30 ml n-pentane were mixed and allowed to react for 5 minutes. Half of the mixture was then added to the polymerisation reactor and the other half was mixed with about 20 mg of a catalyst. After additional 5 minutes the catalyst/TEA/donor/n-pentane mixture was added to the reactor. The Al/Ti mole ratio was 250 mol/mol and the Al/CMMS mole ratio was 10 mol/mol. 70 mmol hydrogen and 1400 g propylene were introduced into the reactor and the temperature was raised within ca 15 minutes to the polymerisation temperature (70 or 80° C., see also Table 2). The polymerisation time after reaching polymerisation temperature was 60 minutes, after which the polymer formed was taken out from the reactor.

TABLE 1

| | Aluminium compound | | Yield and chem. composition of the catalyst | | | | |
|---|---|---|---|---|---|---|---|
| Catalyst | Compound | Amount [ml] | Yield [g] | Ti [wt %] | Al [wt %] | Mg [wt %] | DOP [wt %] |
| Example 1 | TEA | 0.10 | 4.8 | 3.7 | 0.16 | 12.8 | 32.1 |
| Example 2 | TEA | 0.20 | 4.3 | 3.7 | 0.30 | 12.2 | 31.8 |
| Example 3 | TMA | 0.20 | 4.3 | 3.2 | 0.24 | 13.8 | 26.1 |
| Example 4 | TiBA | 0.35 | 4.8 | 3.6 | 0.30 | 11.9 | 30.9 |
| Example 5 | $Et_2AlCl$ | 0.15 | 4.7 | 3.7 | 0.21 | 12.7 | 32.0 |
| Example 6 | $Et_2AlCl$ | 0.35 | 5.0 | 5.3 | 0.04 | 11.6 | 32.1 |
| Example 7 | TEA[1] | 0.10 | 4.6 | 3.9 | 0.06 | 13.5 | 28.2 |
| Example 8 | TEA[2] | 0.10 | 3.9 | 4.8 | 0.30 | 12.5 | 28.4 |
| Example 9 | TEA[2] | 0.50 | 8.1 | 8.4 | 0.68 | 8.8 | 17.8 |
| Example 10 (Comp. Ex.) | No Al-Comp. | — | 4.7 | 2.9 | — | 11.9 | 26.7 |

[1]TEA added to the reaction mixture after heating to 90° C.
[2]TEA added to the washing toluene
TEA: triethyl aluminium
TMA: trimethyl aluminium
TiBA: tri-iso-butyl aluminium
DOP: dioctyl phthalate

TABLE 2

| | | | Catalyst activity and polymer properties | | | | | |
|---|---|---|---|---|---|---|---|---|
| | | | Polymer. temp. = 70° C. | | | Polymer. temp. = 80° C. | | |
| | Aluminium compound | | Activity | MFR[1] | XS[2] | Activity ($a_{80}/a_{70}$) | MFR[1] | XS[2] |
| Catalyst | Compound | Amount [ml] | [kg PP/g cat] | [g/10 min] | [wt %] | [kg PP/g cat] | [g/10 min] | [wt %] |
| Example 1 | TEA | 0.10 | 32.1 | 3.9 | 1.6 | 44.0 (137%) | 6.7 | 1.3 |
| Example 2 | TEA | 0.20 | 33.1 | 3.6 | 2.1 | 38.0 (115%) | 6.6 | 1.4 |
| Example 3 | TMA | 0.20 | 35.1 | 4.2 | 1.5 | 36.3 (103%) | 6.8 | 1.6 |
| Example 4 | TiBA | 0.35 | 34.0 | 4.4 | 1.7 | 36.6 (108%) | 6.9 | 1.4 |
| Example 5 | $Et_2AlCl$ | 0.15 | 35.8 | 5.3 | 2.2 | 34.6 (97%) | 6.7 | 1.4 |
| Example 6 | $Et_2AlCl$ | 0.35 | 21.2 | 10.4 | 5.3 | 21.8 (103%) | 13.3 | 4.0 |
| Example 7 | TEA[3] | 0.10 | 36.6 | 5.3 | 2.3 | 38.4 (105%) | 8.5 | 1.7 |
| Example 8 | TEA[4] | 0.10 | 26.8 | 6.0 | 2.8 | 38.2 (143%) | 9.5 | 2.0 |

TABLE 2-continued

| | | | Catalyst activity and polymer properties | | | | | |
|---|---|---|---|---|---|---|---|---|
| | | | Polymer. temp. = 70° C. | | | Polymer. temp. = 80° C. | | |
| | Aluminium compound | | Activity | MFR[1] | XS[2] | Activity ($a_{80}/a_{70}$) | MFR[1] | XS[2] |
| Catalyst | Compound | Amount [ml] | [kg PP/g cat] | [g/10 min] | [wt %] | [kg PP/g cat] | [g/10 min] | [wt %] |
| Example 9 | TEA[4] | 0.50 | 22.4 | 5.2 | 5.2 | 25.3 (113%) | 13.6 | 4.3 |
| Example 10 (Comp. Ex.) | No Al-Comp | — | 35.8 | 3.4 | 1.3 | 26.7 (74.8) | 5.2 | 1.2 |

[1]ISO 1133, 2.16 kg load at 230° C.
[2]Xylene-soluble fraction of product at 25° C.
[3]TEA added to the reaction mixture after heating to 90° C.
[4]TEA added to the washing toluene

The invention claimed is:

1. A process for preparing an olefin polymerization catalyst component in the form of particles having a predetermined size range, said process comprising the steps of:
   a) preparing a solution of a complex of a Group 2 metal and an electron donor by reacting a compound of said metal with said electron donor or a precursor thereof in an organic liquid reaction medium;
   b) adding said solution of said complex to at least one compound of a transition metal to produce an emulsion, the dispersed phase of which contains more than 50 mol % of the Group 2 metal in said complex;
   c) agitating the emulsion in order to maintain the droplets of said dispersed phase within such an average size range of 5 to 200 μm;
   d) solidifying said droplets of the dispersed phase by heating; and
   e) recovering the solidified particles of the olefin polymerization catalyst component;
wherein an aluminum alkyl compound of the general formula $AlR_{3-n}X_n$ wherein R stands for a straight chain or branched alkyl group having 1 to 20 carbon atoms; X stands for halogen; and n stands for 0, 1, 2 or 3, is added and brought into contact with the droplets of the dispersed phase of the agitated emulsion before recovering the solidified particles in step e).

2. The process of claim 1, wherein, in step c), the emulsion is agitated in the presence of an emulsion stabilizer and/or a turbulence minimizing agent (TMA).

3. The process of claim 1, further comprising washing and drying said solidified particles prior to recovering the solidified particles in step e) and wherein the aluminum alkyl compound of the general formula $AlR_{3-n}X_n$ is added and brought into contact with the droplets of the dispersed phase of the agitated emulsion or the solidified particles before recovering the solidified particles in step e).

4. The process of claim 1, wherein the aluminum alkyl compound of the general formula $AlR_{3-n}X_n$ is brought into contact with the droplets of the dispersed phase of the agitated emulsion before recovering the solidified particles in step e) in an amount so that the final catalyst particles have Al content of 0.05 to 1% weight.

5. The process of claim 1, wherein an aluminum alkyl compound of the general formula $AlR_{3-n}X_n$ is used, wherein R stands for a straight chain or branched alkyl group having 1 to 6 carbon atoms; X stands for chlorine; and n stands for 0, 1, 2 or 3.

6. The process of claim 5, wherein n is 0 and R is ethyl.

7. The process of claim 1, wherein said Group 2 metal is magnesium.

8. The process of claim 1, wherein said liquid organic reaction medium comprises a $C_6$-$C_{10}$ aromatic hydrocarbon or a mixture of $C_6$-$C_{10}$ aromatic hydrocarbon and $C_5$-$C_9$ aliphatic hydrocarbons.

9. The process of claim 1, wherein said liquid organic reaction medium comprises toluene.

10. The process of claim 1, wherein said electron donor is a mono- or diester of an aromatic carboxylic acid or diacid.

11. The process of claim 10, wherein said aromatic carboxylic acid ester or diester is formed in situ by reaction of an aromatic carboxylic acid chloride or diacid dichloride with a $C_2$-$C_{16}$ alkanol and/or diol.

12. The process of claim 10, wherein said aromatic carboxylic acid ester is dioctyl phthalate.

13. The process of claim 1, wherein the preparation of the Group 2 metal complex is carried out at a temperature of 20° to 80° C.

14. The process of claim 13, wherein the Group 2 metal is magnesium and the preparation of the magnesium complex is carried out at a temperature of 50° to 70° C.

15. The process of claim 1, wherein said transition metal is a Group 4 metal, a Group 5 metal, and/or a Group 6 metal or mixtures thereof.

16. The process of claim 1, wherein said transition metal is Cu, Fe, Co, Ni and/or Pd.

17. The process of claim 15, wherein said Group 4 metal is titanium.

18. The process of claim 15, wherein said compound of the transition metal is a halide.

19. The process of claim 1, wherein the mol ratio of the transition metal/Group 2 metal of said disperse phase is 20 to 80.

20. The process of claim 19, wherein the mol ratio of the transition metal/Group 2 metal of said disperse phase is 45 to 75.

21. The process of claim 1, wherein said Group 2 metal complex and said transition metal compound are reacted at a temperature of 10° to 60° C.

22. The process of claim 21, wherein said Group 2 metal complex is a magnesium complex and said transition metal complex is a Group 4 metal compound which are reacted in a temperature range from 20° C. to 50° C.

23. The process of claim 22, wherein the Group 4 metal/Mg mol ratio of said denser oil is 2 to 4 and that of the disperse phase oil is 55 to 65.

24. The process of claim 22, wherein the ratio of the mol ratio Group 4 metal/Mg in the disperse phase oil to that in said denser oil is at least 10.

25. The process of claim 1, wherein said emulsion is composed of a first dispersed phase which is a toluene/$TiCl_4$-insoluble [−] oil having a Group 4 metal/Mg mol ratio greater than 0.1 and less than 10 and a second disperse phase which is an oil less dense than that of the dispersed phase and which has a Group 4 metal/Mg mol ratio of 10 to 100.

26. The process of claim 2, wherein said emulsion stabilizer is a surfactant.

27. The process of claim 26, wherein said surfactant comprises an acrylic polymer or methacrylic polymer.

28. The process of claim 2, wherein the turbulence minimizing agent is added to the reaction mixture before solidifying said droplets of the dispersed phase, said TMA being inert and soluble in the reaction mixture under the reaction conditions.

29. The process of claim 28, wherein the turbulence minimizing agent is a polymer having linear aliphatic carbon backbone chains, optionally having short side chains.

30. The process of claim 28, wherein the turbulence minimizing agent is selected from the group consisting of polymers of α-olefin monomers with 6 to 20 carbon atoms or mixtures thereof.

31. The process of claim 30, wherein the turbulence minimizing agent is selected from polymers of octene, nonene, decene, undecene, dodecene, copolymers or mixtures of polymers thereof.

32. The process of claim 2, wherein the turbulence minimizing agent is added to the emulsion in an amount of 1 to 1,000 ppm.

33. The process of claim 1, wherein R stands for a straight chain or branched alkyl group having 1 to 10 carbon atoms.

34. The process of claim 33, wherein R stands for a straight chain or branched alkyl group having 1 to 6 carbon atoms.

35. The process of claim 4, wherein the aluminum alkyl compound of the general formula $AlR_{3-n}X_n$ is brought into contact with the droplets of the dispersed phase of the agitated emulsion before recovering the solidified particles in step e) in an amount so that the final catalyst particles have Al content of 0.1 to 0.8% by weight.

36. The process of claim 35, wherein the aluminum alkyl compound of the general formula $AlR_{3-n}X_n$ is brought into contact with the droplets of the dispersed phase of the agitated emulsion before recovering the solidified particles in step e) in an amount so that the final catalyst particles have Al content of 0.2 to 0.7% by weight.

37. The process of claim 11, wherein said aromatic carboxylic acid ester is dioctyl phthalate.

38. The process of claim 16, wherein said compound of the transition metal is a halide.

39. The process of claim 17, wherein said compound of the transition metal is a halide.

40. The process of claim 23, wherein the ratio of the mol ratio Group 4 metal/Mg in the disperse phase oil to that in said denser oil is at least 10.

41. The process of claim 29, wherein the turbulence minimizing agent is selected from the group consisting of polymers of α-olefin monomers with 6 to 20 carbon atoms or mixtures thereof.

42. The process of claim 41, wherein the turbulence minimizing agent is selected from polymers of octene, nonene, decene, undecene, dodecene, copolymers or mixtures of polymers thereof.

43. The process of claim 2, wherein the turbulence minimizing agent is added to the emulsion in an amount of 5 to 100 ppm.

44. The process of claim 2, wherein the turbulence minimizing agent is added to the emulsion in an amount of 5 to 50 ppm.

45. The process of claim 29, wherein said polymer is selected from α-olefin polymers having a high molecular weight of about $1\text{-}40\times10^6$, or mixtures thereof.

* * * * *

UNITED STATES PATENT AND TRADEMARK OFFICE
CERTIFICATE OF CORRECTION

PATENT NO. : 7,659,223 B2
APPLICATION NO. : 10/529812
DATED : February 9, 2010
INVENTOR(S) : Leinonen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1116 days.

Signed and Sealed this

Thirtieth Day of November, 2010

David J. Kappos
*Director of the United States Patent and Trademark Office*